United States Patent
Kikkawa et al.

(10) Patent No.: US 7,996,538 B2
(45) Date of Patent: Aug. 9, 2011

(54) INFORMATION PROCESSING APPARATUS AND CONTENT INFORMATION PROCESSING METHOD FOR TRANSMITTING CONTENT AND EVENT INFORMATION TO A CLIENT

(75) Inventors: Norifumi Kikkawa, Tokyo (JP); Yoichi Kobori, Kanagawa (JP); Takehiko Morita, Kanagawa (JP); Masaaki Hamada, Tokyo (JP); Tatsuya Igarashi, Tokyo (JP); Kazuhiro Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 10/544,793
(22) PCT Filed: Feb. 26, 2004
(86) PCT No.: PCT/JP2004/002290
§ 371 (c)(1), (2), (4) Date: Aug. 8, 2005
(87) PCT Pub. No.: WO2004/077303
PCT Pub. Date: Sep. 10, 2004

(65) Prior Publication Data
US 2006/0195545 A1    Aug. 31, 2006

(30) Foreign Application Priority Data
Feb. 28, 2003 (JP) .................. 2003-052376

(51) Int. Cl.
G06F 15/16 (2006.01)
G06F 15/173 (2006.01)
(52) U.S. Cl. ...................... 709/227; 709/203
(58) Field of Classification Search .......... 709/203, 709/206, 224, 227, 228
See application file for complete search history.

(56) References Cited

U.S. PATENT DOCUMENTS
6,006,241 A * 12/1999 Purnaveja et al. ............ 715/205
(Continued)

FOREIGN PATENT DOCUMENTS
JP    2001-333131    11/2001
(Continued)

OTHER PUBLICATIONS
Cohen, et al. "General Event Notification Architecture Base: Client to Arbiter", 1999, IETF.*
(Continued)

Primary Examiner — Patrice L Winder
Assistant Examiner — Julian Chang
(74) Attorney, Agent, or Firm — Oblon, Spivak, McClelland, Maier & Neustadt, L.L.P.

(57) ABSTRACT

The present invention provides an apparatus and method capable of efficiently sending an event corresponding to content to be transmitted from a server to each client. A content providing server assigns a session ID to each client on condition that the server receives an event notification request, which specifies an event URL, from the client and then manages an event notification process on the basis of the event URL and the session ID. When respectively transmitting pieces of content to a plurality of clients, the server determines event information to be transmitted on the basis of each event URL regarding the corresponding piece of content and controls event notification timing for each client on the basis of the corresponding session ID. According to the present configuration, the load of managing data in the event notification process on the server can be reduced and a correct event synchronized with transmission content can be sent to each client.

22 Claims, 15 Drawing Sheets

U.S. PATENT DOCUMENTS

| | | | |
|---|---|---|---|
| 6,199,076 B1* | 3/2001 | Logan et al. | 715/203 |
| 6,336,135 B1* | 1/2002 | Niblett et al. | 709/215 |
| 6,779,004 B1* | 8/2004 | Zintel | 709/227 |
| 7,009,980 B1* | 3/2006 | Cao | 370/395.54 |
| 7,093,191 B1* | 8/2006 | Jain et al. | 715/201 |
| 7,171,475 B2* | 1/2007 | Weisman et al. | 709/227 |
| 7,213,036 B2* | 5/2007 | Apparao et | 707/104.1 |
| 7,295,752 B1* | 11/2007 | Jain et al. | 386/46 |
| 2001/0013068 A1 | 8/2001 | Klemets et al. | |
| 2001/0025307 A1* | 9/2001 | Venkatraman et al. | 709/218 |
| 2002/0013852 A1 | 1/2002 | Janik | |
| 2002/0099831 A1 | 7/2002 | Tsunogai | |
| 2002/0107973 A1* | 8/2002 | Lennon et al. | 709/231 |
| 2002/0120749 A1 | 8/2002 | Widegren et al. | |
| 2002/0124112 A1* | 9/2002 | Tso | 709/246 |
| 2002/0129371 A1* | 9/2002 | Emura et al. | 725/61 |
| 2002/0198943 A1* | 12/2002 | Zhuang et al. | 709/206 |

FOREIGN PATENT DOCUMENTS

| | | |
|---|---|---|
| JP | 2002-328851 | 11/2002 |

OTHER PUBLICATIONS

European Search Report issued Feb. 23, 2011, in Patent Application No. 04714886.1.

* cited by examiner

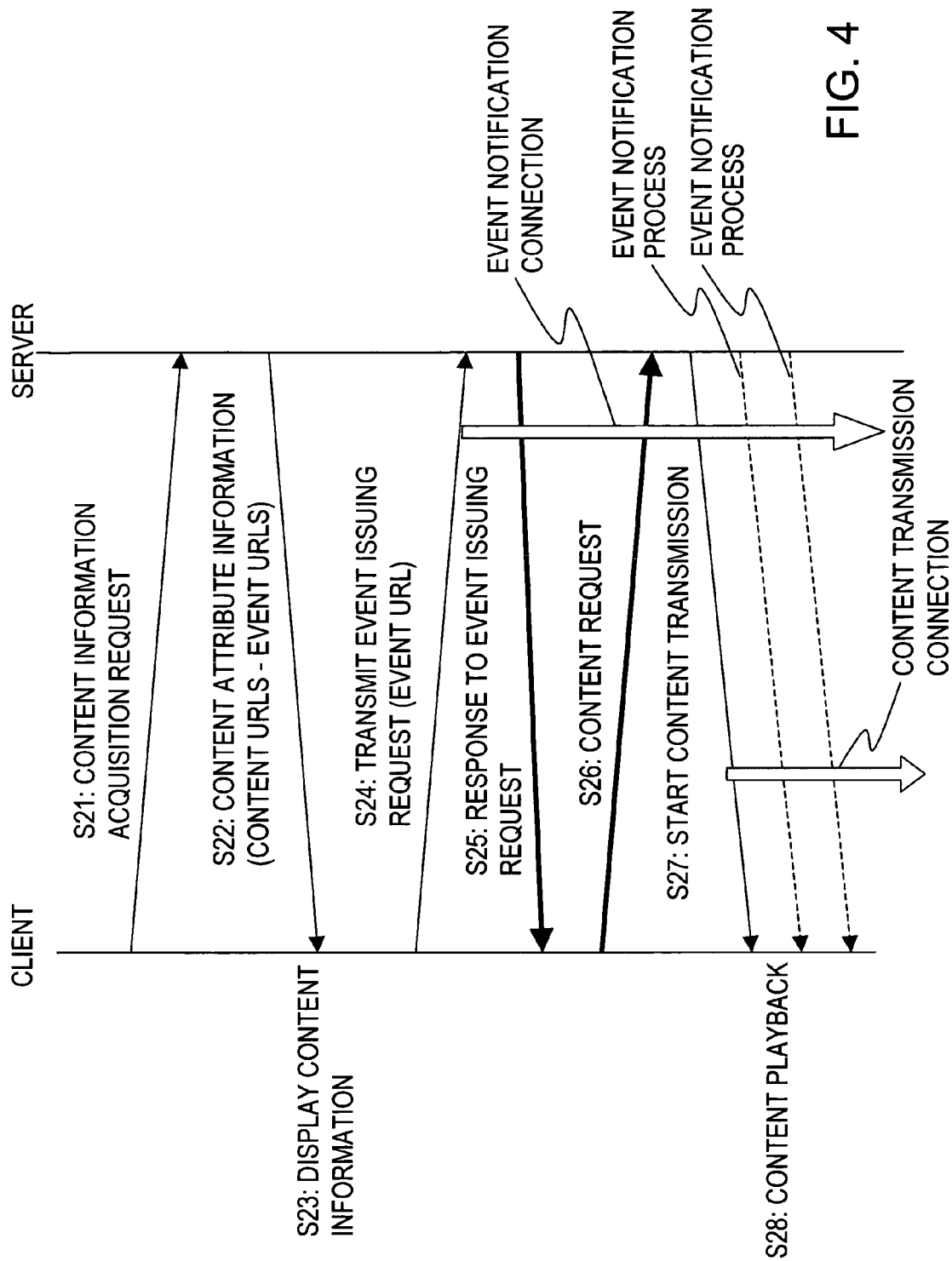

FIG. 5

| Property Name | Type | Multiple | Property Description |
|---|---|---|---|
| av:totalSize | unsigned long | no | SIZE (ORIGINAL SIZE) OF RESOURCE INCLUDED IN CONTAINER. ROUGH ESTIMATE CAN BE USED. IN BYTE UNITS |
| av:totalDuration | duration | no | TOTAL DURATION OF RESOURCE INCLUDED IN CONTAINER. ROUGH ESTIMATE CAN BE USED. |
| av:recordQualityLevel | integer | no | QUALITY LEVEL {1, 2, 3, 4, 5, 6, OR 7} OF CONTENT REGARDING MOVING IMAGES, 3... 2 Mbps, 4... 4 Mbps, OR 5... 8 Mbps IS SET AS GUIDE. LEVEL IS NOT STRICTLY DETERMINED. WHEN QUALITY LEVELS VARY FROM "RES" TO "RES", HIGHEST LEVEL IS SET (res@av:recordQualityLevel IS SET EVERY "RES"). |
| av:eventing URL | URL | no | URL INDICATING LOCATION IDENTIFICATION VALUE OF EVENT INFORMATION REGARDING CORRESPONDING CONTENT |

| CONTENT No. | TITLE | ARTIST NAME | ... | EVENT NOTIFICATION |
|---|---|---|---|---|
| 0001 | Abc··ffg | Csde··fddd | ... | PRESENCE |
| 0002 | | | | ABSENCE |
| | | | | |
| | | | | |
| | | | | |

| CLIENT | SESSION ID |
|---|---|
| CLIENT A | 123aac33 |
| CLIENT B | 253bed31 |
| .. | .. |
| CLIENT N | 753bab55 |

| EVENT PARAMETER NAME | DESCRIPTION |
|---|---|
| START | EVENT SYNCHRONIZED WITH CONTENT STARTS (CONTENT PLAYBACK STARTS) |
| LAST | END OF TRANSMISSION OF EVENT INFORMATION SYNCHRONIZED WITH CONTENT |
| BufferInfo | SERVER ALWAYS TRANSMITS DATA ONCE PER 30 SECONDS WHILE EVENT NOTIFICATION CONNECTION IS EXISTING. CLIENT WHICH DOES NOT RECEIVE EVENT IS ASSUMED TO BE NOT IN EXISTENCE.<br>DATA CONTAINS MAXIMUM BUFFER CAPACITY (DURATION), CAPACITY (DURATION) IN WHICH SEEKING IS POSSIBLE CURRENTLY, TIME IN CURRENT STREAMING TIME BASE, NOW (SEEK DEFAULT) TIME.<br><br>FORMAT<br>BufferInfo=[maxBufferDuration][currentBufferDuration][currentPlayingTime] [NowTime]<br>EXAMPLE WHERE CONTENT IS VIDEO CAPSULE<br>Event:BufferInfo=[00:10:00.000][00:10:00.000][00:04:30.000][00:00:00]CRLF<br>EXAMPLE WHERE CONTENT IS LIVE<br>Event:BufferInfo=[00:30:00.000][00:16:32.500][132:42:30.000][132:42:30.000]CRLF |
| AudioMode | DATA INDICATES AUDIO MODE.<br>CORRECT AllowedValue OF AudioMode IS SEPARATELY DEFINED IN VIDEO SPECIFICATION. EXAMPLES ARE AS FOLLOWS.<br><br>\| Monaural \| MONAURAL \|<br>\| Stereo \| STEREO \|<br>\| Bilingual \| BILINGUAL \| |

INFORMATION PROCESSING APPARATUS AND CONTENT INFORMATION PROCESSING METHOD FOR TRANSMITTING CONTENT AND EVENT INFORMATION TO A CLIENT

TECHNICAL FIELD

The present invention relates to information processing apparatuses and content information processing methods. In particular, the present invention relates to an information processing apparatus and a content information processing method, each of which efficiently executes a process of sending event information regarding content to be distributed from a content providing server to clients in a network connection configuration, such as a home network or the Internet.

BACKGROUND ART

In recent years, the use of various pieces of content has been being increased over a network. In other words, various pieces of content, such as still images, moving images, and audio data (music tracks), are stored and managed in a content distribution server in the Internet or a server in an intranet or a home network, a user searches those pieces of content through a client device connected to the network, the client device receives desired content from the server, and the received content is output and is played back on the client side.

For example, when content, such as audio data or image data, stored in the server is played back on the client-side device, a typical processing sequence is as follows. First, an information acquisition request is transmitted from the client side to the server in order to acquire content information, such as the titles of music tracks or movies and artist names, and various pieces of content attribute information, such as data compression format information (e.g., ATRAC: adaptive transform acoustic coding or MPEG: moving picture experts group) and, as necessary, copyright information, the content information and the content attribute information being stored in the server. The attribute information is called as metadata or meta-information.

In response to the request from the client, the server transmits metadata (attribute information) relating to content stored in the server to the client. The client displays content information in a display of the client device according to a predetermined display program on the basis of the metadata acquired from the server. For example, a music title list including artist names and music track titles is displayed in the display. A user checks pieces of content to be played back or selects any one piece of content on the basis of the displayed information and then transmits a content transmission request to the server. The server receives a content request from the client and transmits content to the client in response to the received request. The received content is played back on the client side.

As data communication networks are becoming widespread, a home network is becoming popular. Home electric appliances, a computer, and other peripheral devices are connected through the home network in the home to realize communications between the devices. In the home network, the devices connected to the network communicate with each other such that data processing functions of the respective device are shared and content is transferred between the devices, thus providing convenience and amenity to the user. The home network is sure to be used even more widely in the future.

As a protocol suitable for the configuration of the home network, Universal Plug and Play (UPnP) is known. According to Universal Plug and Play (UPnP), a network can be easily established without complicated operations, and services provided by devices connected to the network are receivable in the connected devices without difficult operations and settings. UPnP does not depend on the OS (operating system) of each device. Advantageously, a new device can be easily connected to the network.

According to UPnP, the connected devices exchange definition files based on XML (extensible Markup Language) therebetween to recognize each other. General processes according to UPnP are as follows:

(1) An addressing process of obtaining its own device ID such as an IP address;

(2) A discovery process of retrieving the other devices connected to the network and receiving a response from each of the devices to obtain information, such as a device type and functions, included in the response; and (3) A service request process of requesting a service to each device on the basis of the information obtained by the discovery process.

The above-mentioned processes are performed, so that services using the devices connected to the network can be provided and obtained. A device, which is newly connected to the network, obtains a device ID by the above-mentioned addressing process and further acquires information regarding the other devices connected to the network by the discovery process, so that the device can request a service to each of the other devices on the basis of the acquired information.

In some cases, simultaneously with a content distribution process of distributing content from a content providing server to a client, event notification is performed such that the server notifies the client of information related to content, e.g., various pieces of information related to content to be distributed, such as information regarding the start or end of content distribution and information regarding a change of a content distribution channel.

For example, in a system using the above-mentioned UPnP, an architecture called GENA (Generic Event Notification Architecture) is used as an event notification architecture. According to GENA, an event notification process of sending event information in HTTP (Hyper Text Transfer Protocol) from a content providing server to a client is executed. When there is any change in state variable of a service, such as a content distribution service, provided to a client by the server, a GENA-notify message is transmitted to the client to notify the client of the change of state. For example, Japanese Unexamined Patent Application Publication No. 2002-328851 (Patent Document 1) discloses a system for controlling audio visual devices utilizing GENA.

According to the event notification process, including the above-mentioned GENA, executed simultaneously with the common content distribution, fundamentally, the server individually notifies each client of an event. If many clients access one server to receive content, unfortunately, the load of the event notification process on the server becomes excessive. As events sent from the server increase, disadvantageously, network traffic also increases.

DISCLOSURE OF INVENTION

The present invention is made in consideration of the above disadvantages in the above-mentioned related art and it is an object of the present invention to provide an information processing apparatus and a content information processing method, which are capable of efficiently and accurately executing an event notification process of sending event information related to content to be distributed from a content distributing server to a client which receives content.

According to a first embodiment of the present invention, there is provided an information processing apparatus, serving as a content providing server, for transmitting content, the apparatus including:

a data transmission and reception unit for transmitting and receiving data;

a storage unit for storing location information of event information corresponding to content as metadata concerning content; and a control unit for controlling transmission of content and event information to each client, wherein the control unit generates a session ID corresponding to each client in response to an event issuing request, which specifies location information of event information, from the client, sends the generated session ID to the client, enters the session ID in a session ID table such that the session ID is associated with the corresponding client, transmits content in response to a content request with the session ID from the client, and sends event information specified based on the location information to the client simultaneously with the content transmission.

Further, in the information processing apparatus according to this embodiment of the present invention, the control unit determines a data transmission position of transmission content to each client on the basis of the session ID table in which each client is associated with the corresponding session ID and sends event information synchronized with the transmission content to each client on the basis of information regarding the determination.

Further, in the information processing apparatus according to this embodiment of the present invention, in response to a content information acquisition request from each client, the control unit generates content information including content URLs and the event URL information, the content URLs indicating location information of content.

Further, in the information processing apparatus according to this embodiment of the present invention, event information corresponding to content includes at least one of start information regarding content to be transmitted to a client, end information regarding thereto, buffer status information, and audio mode information, and the control unit sends the information to the client simultaneously with the content transmission to the client.

Further, in the information processing apparatus according to this embodiment of the present invention, the control unit generates and transmits the event information as a communication packet according to HTTP (Hyper Text Transfer Protocol).

Further, in the information processing apparatus according to this embodiment of the present invention, the control unit transmits data to confirm the existence of the client at regular time intervals through an event information notification connection simultaneously with the content transmission to the client and determines whether the client is existing on the basis of the presence or absence of a response from the client to the transmitted data.

According to a second embodiment of the present invention, there is provided an information processing apparatus, serving as a client, for playing back content, including:

a data transmission and reception unit for transmitting and receiving data to/from a server which provides content; and a control unit for generating an event issuing request to be transmitted to the server such that the event issuing request contains location information of event information corresponding to content and generating a content request to be transmitted to the server such that the content request contains a session ID included in data received from the server, the data serving as a response to the event issuing request.

Further, in the information processing apparatus according to this embodiment of the present invention, the control unit transmits an HTTP (Hyper Text Transfer Protocol) POST-method request, serving as the event issuing request, to the server.

Further, in the information processing apparatus according to this embodiment of the present invention, the information processing apparatus receives content from the server and simultaneously receives event information corresponding to the content through a connection identified by the corresponding session ID.

Further, in the information processing apparatus according to this embodiment of the present invention, the control unit generates display information in a form allowing to specify any of event URLs (Uniform Resource Locators), which are included in content information received from the server and indicate location information of event information corresponding to content.

According to a third embodiment of the present invention, there is provided a content distribution system including a server which transmits content and clients each of which transmits a content request to the server, wherein the server includes:

a data transmission and reception unit for transmitting and receiving data;

a storage unit for storing location information of event information corresponding to content as metadata concerning content; and a server control unit for generating a session ID corresponding to each client in response to an event issuing request, which specifies location information of event information, from the client, sends the generated session ID to the client, enters the session ID in a session ID table such that the session ID is associated with the corresponding client, transmits content in response to a content request with the session ID from the client, and sends event information specified based on the location information to the client simultaneously with the content transmission, and each client includes:

a data transmission and reception unit for transmitting and receiving data to/from the server; and a client control unit for generating an event issuing request to be transmitted to the server such that the event issuing request contains location information of event information corresponding to content and generates a content request to be transmitted to the server such that the content request contains a session ID included in data received from the server, the data serving as a response to the event issuing request.

Further, in the content distribution system according to this embodiment of the present invention, the server control unit determines a data transmission position of transmission content to each client on the basis of the session ID table in which each client is associated with the corresponding session ID and sends event information synchronized with the transmission content to each client on the basis of information regarding the determination.

According to a fourth embodiment of the present invention, there is provided a content information processing method including:

an event issuing request reception step of receiving an event issuing request from a client, the request specifying location information of event information corresponding to content;

a step of generating a session ID corresponding to the client in response to the event issuing request and sending the generated session ID to the client;

a step of entering the session ID in a session ID table such that the session ID is associated with the corresponding client;

a content transmission step of transmitting content in response to a content request with the session ID from the client; and an event notification step of sending event information specified by the location information simultaneously with the content transmission.

Further, in the content information processing method according to this embodiment of the present invention, in the event notification step, a data transmission position of content to be transmitted to each client is determined on the basis of the session ID table in which each client is associated with the corresponding session ID and event information synchronized with the transmission content is sent to the client on the basis of information regarding the determination.

Further, the content information processing method according to this embodiment of the present invention includes a step of generating content information which contains content URLs and the event URL information in response to a content information acquisition request from each client, the content URLs indicating location information of content.

Further, in the content information processing method according to this embodiment of the present invention, event information corresponding to content includes at least one of start information regarding content to be transmitted to a client, end information regarding thereto, buffer status information, and audio mode information, and in the event notification step, any of the information is sent to the client simultaneously with the content transmission to the client.

Further, in the content information processing method according to this embodiment of the present invention, in the event notification step, a communication packet according to HTTP (Hyper Text Transfer Protocol) is generated and transmitted as the event information.

Further, the content information processing method according to this embodiment of the present invention includes a step of transmitting data to confirm the existence of the client at regular time intervals through an event information notification connection simultaneously with the content transmission to the client and determines whether the client is existing on the basis of the presence or absence of a response from the client to the transmitted data.

Further, according to a fifth embodiment of the present invention, there is provided a content information processing method including:

an event issuing request step of generating an event issuing request to be transmitted to a server such that the event issuing request contains location information of event information corresponding to content and transmitting the generated request to the server; and a content request step of generating a content request which contains a session ID received as a response to the event issuing request from the server and transmitting the generated content request to the server.

Further, in the content information processing method according to this embodiment of the present invention, in the event issuing request step, an HTTP (Hyper Text Transfer Protocol) POST-method request is transmitted as the event issuing request to the server.

Further, the content information processing method according to this embodiment of the present invention includes a step of receiving content from the server and simultaneously receiving event information corresponding to the content through a connection identified by the session ID.

Further, the content information processing method according to this embodiment of the present invention includes a step of generating display information in a form allowing to specify any of event URLs (Uniform Resource Locators), which are included in content information received from the server and indicate location information of event information corresponding to content.

In a configuration according to the present invention, a content providing server assigns a session ID to a client on condition that the server receives an event notification request which specifies an event URL from the client, and manages an event notification process on the basis of the event URL and the session ID. Therefore, when transmitting content to a plurality of clients, event information to be transmitted can be determined based on an event URL associated with the corresponding piece of content. Timing when event information is sent to each client can be controlled on the basis of the corresponding session ID. Consequently, the load of managing data in the event notification process on the server can be reduced. Even when content is transmitted to a plurality of clients at different timings, correct event information synchronized with transmission content can be sent to each client by control based on the corresponding session ID.

In the configuration according to the present invention, the server which provides content stores event URL information in metadata corresponding to content. In response to a content information request from a client, the server extracts content URLs from the metadata, generates content information, and sends the generated content information to the client. Advantageously, an event URL can be efficiently acquired and event data can be transmitted to the client on the basis of a specification about content.

In the configuration according to the present invention, further, the server determines a data transmission position of content to be transmitted to each client on the basis of a session ID table in which each client is associated with the corresponding session ID and then sends event information to the client synchronously with the transmission content. Advantageously, an event notification process synchronized with content transmission for each client can be correctly executed.

Further, in the configuration of the present invention, each client receives event URLs from the server, generates a content list in which any event URL can be specified, and displays the list. In addition, when a user clicks on an event URL or link data, the client transmits the specified event URL to the server. Thus, event notification corresponding to content to be transmitted can be set without increasing burdens on the user.

Other objects, features, and advantages of the present invention will become more apparent from the following detailed description based on embodiments of the present invention and the accompanying drawings. In the present specification, a system is a logical set of units. It is not necessarily that the units are included in the same casing.

BRIEF DESCRIPTION OF THE DRAWINGS

FIG. 4 is a diagram explaining a processing sequence between a server and a client when event information is sent simultaneously with content transmission.

FIG. 5 is a diagram explaining property information, including an event URL, to be transmitted to a server.

FIG. 6 is a diagram showing a display example of content information including data whereby any of event URLs can be specified.

FIG. 8 is a diagram showing an example of a session ID table possessed in a server.

FIG. 9 is a diagram explaining kinds of event information transmitted from a server to a client.

BEST MODE FOR CARRYING OUT THE INVENTION

An information processing apparatus and a content information processing method according to the present invention will now be described in detail below with reference to the drawings.

[System Overview]

Figure 1:
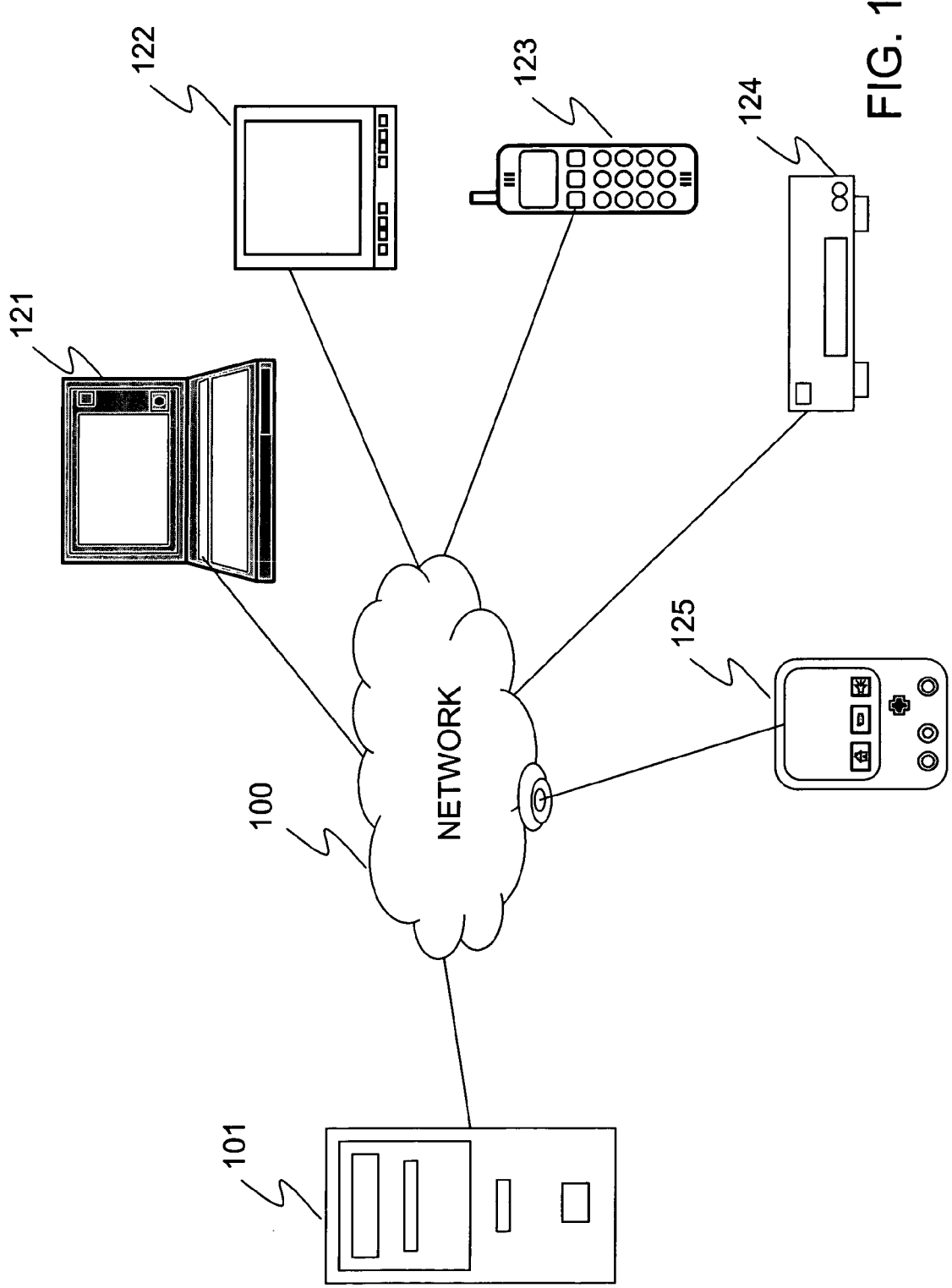
FIG. 1 is a diagram showing an example of the configuration of a network to which the present invention can be applied.

An example of the configuration of a network which the present invention can be applied to will now be described with reference to FIG. 1. FIG. 1 shows the connection of a server 101 to clients through a network 100, e.g., the configuration of a home network. The server 101 serves as a content distributing apparatus for executing processes in response to process requests from various client devices. Each client serves as a content receiving device for sending a process request to the server 101. The client devices include, e.g., a personal computer (PC) 121, a monitor 122, a mobile phone 123, a playback unit 124, and a PDA (Personal Digital Assistant) 125. Other various electronic devices and household electric appliances can be connected as client devices.

Processes which the server 101 executes in response to requests from the clients include, e.g., distributing content stored in storage means, such as a hard disk, included in the server 101 to the clients. On condition that the server 101 has a tuner function for receiving live content through, e.g., satellite broadcasting, the server 101 provides a content distribution service to transfer live content to the clients. FIG. 1 shows the server 101 and the client devices such that they are distinguished from each other. An apparatus for providing a service in response to a request from each client is illustrated as the server. Each client device can function as a server when providing its data processing service to at least one of the other client devices. Therefore, each of the client devices, connected to the network in FIG. 1, may function as a server.

The network 100 is either wired or wireless. Each connected device transmits and receives communication packets in, e.g., Ethernet (registered trademark) frames over the network 100. In other words, each client transmits an Ethernet frame, of which the data field stores process request information, to the server 101, thus requesting the server 101 to execute data processing. In response to the process request frame, the server 101 executes data processing. As necessary, the server 101 stores data regarding a result of the data processing in the data field of a communication packet and then transmits the packet to the client.

Each network connected device is a device compatible with, e.g., Universal Plug and Play (UPnP). Therefore, the device can be easily added or eliminated to/from the devices connected to the network. A device newly connected to the network executes the following processes, so that the device can receive each service using the corresponding network connected device:

(1) An addressing process of obtaining its own device ID, such as an IP address;

(2) A discovery process of retrieving devices on the network and receiving responses from the respective devices to obtain information, such as a type of device and functions thereof, included in each response; and (3) A service request process of requesting a service from each device on the basis of the information obtained by the discovery process.

An example of the hardware configuration of a PC, serving as an example of an information processing apparatus which functions as the server or the client device shown in FIG. 1.

A CPU (Central Processing Unit) 201 executes various processes according a program stored in a ROM (Read Only Memory) 202 or an HDD (Hard Disk Drive) 204 and functions as data processing means or communication control processing means. A RAM (Random Access Memory) 203 stores the program executed by the CPU 201 and data as appropriate. The CPU 201, the ROM 202, the RAM 203, and the HDD 204, are connected to each other through a bus 205.

An input-output interface 206 is connected to the bus 205. For example, an input unit 207 and an output unit 208 are connected to the input-output interface 206. The input unit 207 includes a keyboard, switches, buttons, a pointing device, and a mouse which a user operates. The output unit 208 includes an LCD or a CRT, which shows various pieces of information to the user, and a speaker. In addition, a communication unit 209, functioning as data transmission and reception means, and a drive 210 are connected to the input-output interface 206. A removable recording medium 211, such as a magnetic disk, an optical disk, a magneto-optical disk, or a semiconductor memory can be loaded into the drive 210, which reads and writes data from/to the removable recording medium 211.

Figure 2:
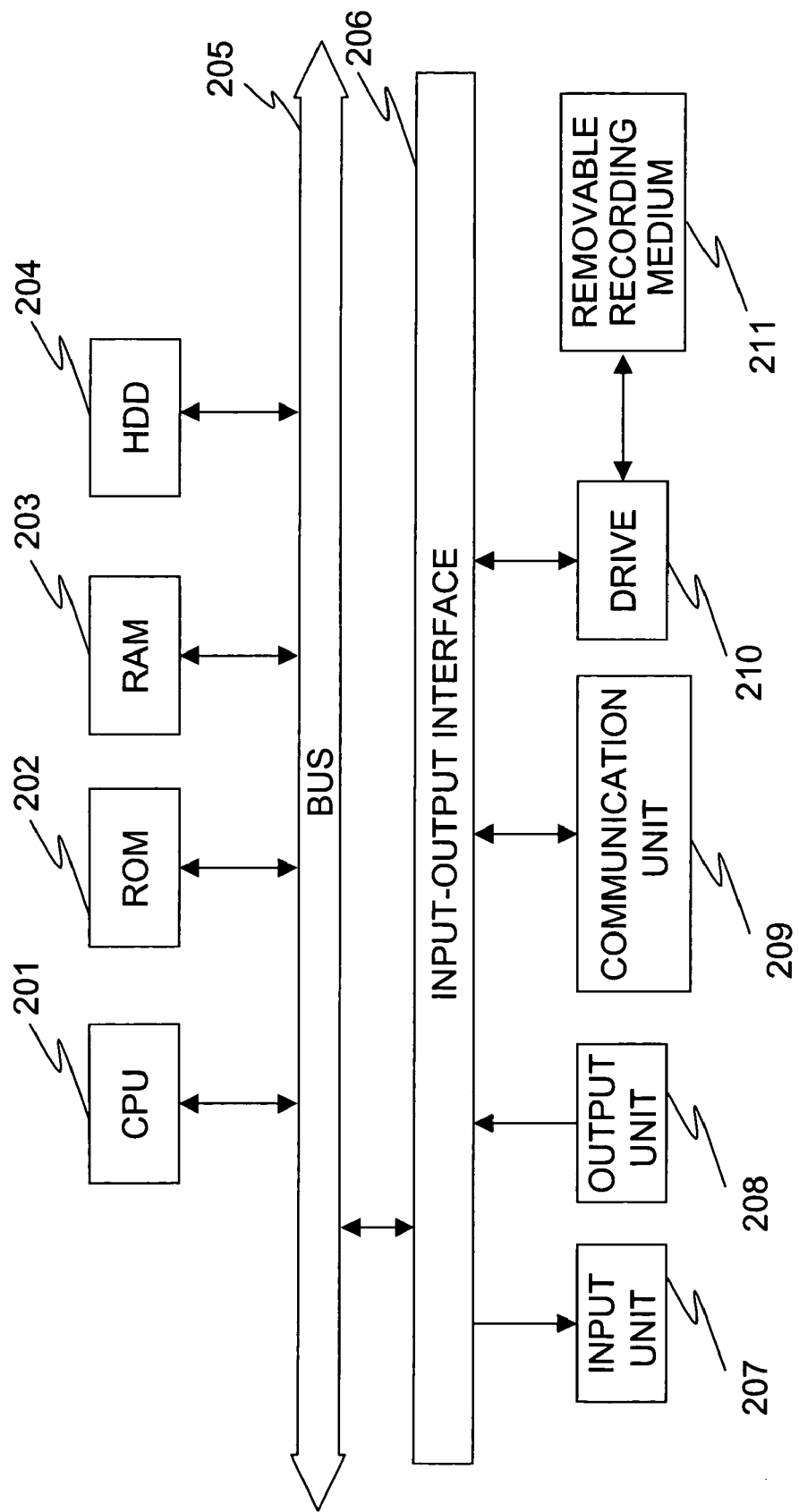
FIG. 2 is a diagram explaining an example of the configuration of a device connected to the network.

FIG. 2 shows an example of the configuration of the personal computer (PC) functioning as a server which serves as a network connected device shown in FIG. 1. The network connected device is not limited to a PC. As shown in FIG. 1, various electronic devices and information processing apparatuses, e.g., a mobile phone, a portable communication terminal, such as a PDA, a playback unit, and a display can be used as network connected devices. Therefore, the respective devices can have individual unique hardware configurations. Each device executes a process according to its hardware.

[Metadata]

Metadata possessed by a server which stores content to be distributed to clients will now be described. The server holds metadata, serving as pieces of attribute information corresponding to respective pieces of content including image data, such as still images and moving images, and audio data, such as music tracks, stored in a storage unit of the server.

Content including image data, such as still images and moving images, and audio data, such as music tracks, possessed by the server is collectively called AV content. In the server, AV content is managed according to a content directory having a hierarchical structure.

The content directory has a hierarchical structure including folders, in each of which a piece or pieces of AV content are stored. Each element included in the content directory, i.e., each folder storing a piece or pieces of AV content is called an object. The object is a generic name for a data unit to be processed by the server. There are various objects in addition to the folders each storing a piece or pieces of AV content.

The minimum unit of AV content, i.e., each of a piece of music data, a piece of moving image data, and a piece of still image data is called an item.

The objects are categorized into classes, i.e., audio, video, and photo classes and are subjected to class labeling. Each client can specify a certain class, request searching for only objects belonging to the specified class, and execute the searching. In the server, the classes are hierarchically managed such that each class can include subclasses.

Metadata is management information including attribute information corresponding to content possessed by the server, class definition information, and information regarding the hierarchical structure constituting the content directory. Metadata, serving as content attribute information defined such that it is associated with the corresponding object, includes various pieces of information, i.e., a content identifier (ID), the size of data, resource information, a title, an artist name, and copyright information. Each piece of information included in metadata is called a property. The kinds of properties in metadata are previously defined in each of the above-mentioned classes, i.e., the audio, video, and photo classes.

[Content Playback Process by Client]

For example, to play back content, a client can request a server to distribute content, receive the requested content, and play back the received content. A typical content playback process will now be described with reference to FIG. 3. In step S11, a client requests a server to distribute content information possessed by the server. In step S12, in response to the request from the client, the server generates XML (extended Markup Language) data as content information on the basis of metadata corresponding to content. The content information includes a list of content URLs (Uniform Resource Locators), serving as address information, indicating the locations of pieces of content in addition to content titles and artist names. The server transmits the XML data to the client.

In step S13, the client displays the content information on a display on the basis of the received XML data. For example, regarding audio content, the content information is displayed as a table including titles of music tracks corresponding to pieces of audio content held by the server, artist names, and playback time of each music track.

In step S14, the client selects a music track to be received from the server and be played back in the client device, specifies a content URL as content specification information, and transmits the information to the server. On the basis of the received content specification information, the server obtains content from storage means and transmits the content. In step S16, the client plays back the content transmitted from the server. When content is ATRAC- or MPEG-compressed, the content is decompressed on the server or client side and is then transmitted or played back.

[Event Notification Process]

Figure 3:
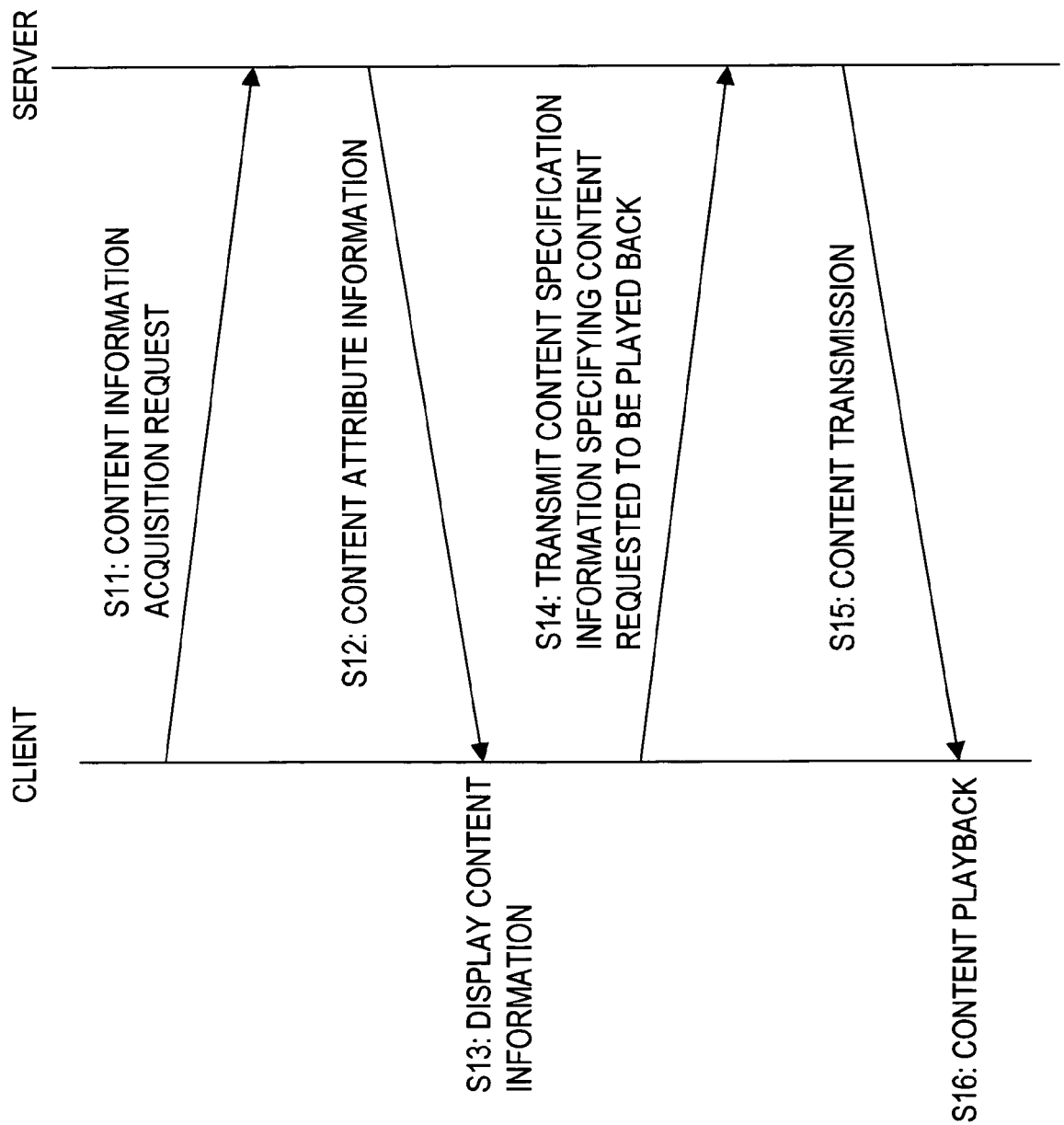
FIG. 3 is a diagram explaining a processing sequence between a server and a client in a content data playback process.

According to the above-mentioned process described with reference to FIG. 3, the client acquires content information from the server, selects content to be played back on the basis of the acquired content information, transmits selection information to the server, and obtains the content to be played back.

According to the above-mentioned process, the client continuously receives desired content from the server until the content is completed. The received content includes content stored in storage means, such as a hard disk, included in the server or live content received by the server through, e.g., satellite broadcasting when the server has a tuner function provided in a home network.

In the configuration according to the present invention, simultaneously with the transmission of content from a server to a client, the client is notified of an event occurred, e.g., a change in state of the transmitted content. In event notification according to the present invention, information sent from the server to the client includes information regarding a change in audio mode between stereo, monaural, and bilingual, information regarding the start of streaming, information regarding the end thereof, and buffer status information regarding content data on the server side.

A content playback processing sequence involving an event notification process will now be described with reference to FIG. 4. In step S21, a client requests a server to distribute content information held by the server. In step S22, in response to the request from the client, the server generates XML data based on property information constituting metadata corresponding to content and transmits the data to the client.

Content information which is transmitted to the client includes content titles and artist names and also includes a list of content URLs (Uniform Resource Locators), serving as address information, indicating the locations of pieces of content and event notification URLs set in association with content to be provided, i.e., event URLs (Uniform Resource Locators), serving as address information, indicating the locations of pieces of event information set in association with content. The server generates the above-mentioned information as XML (extended Markup Language) data and transmits the data to the client.

The client can specify an object, i.e., a type of content upon requesting the acquisition of property information. For example, the client can specify any one of the above-mentioned classes, i.e., the audio, video, and photo classes and request the acquisition of property information of objects included in the specified class.

When receiving the property information acquisition request from the client, the server obtains metadata corresponding to content from storage means and generates XML data including property information to be transmitted to the client on the basis of the obtained metadata. In step S22 in the sequence diagram of FIG. 4, the server transmits the generated XML data to the client.

The server holds various pieces of property information as content attribute information. Attribute information regarding content data is metadata and each element constituting metadata is property information. FIG. 5 shows some pieces of property information. Property information is provided to the client in response to the content information acquisition request from the client.

FIG. 5 shows some pieces of property information provided to the client. FIG. 5 shows property names (Property Name), data types (Type), such as a number and a character string, data (Multiple) indicating whether pieces of data can exist, and the descriptions of property (Property Description).

Referring to FIG. 5, "total Size" indicates data regarding the size of content. A "container" means an object serving as a folder which stores content. "total Duration" indicates data regarding the duration of content. "record Quality Level" indicates data regarding a quality level as content recording quality in the range of, e.g., 1 to 7. The quality level is set such that 3=2 Mbps, 4=4 Mbps, or 5=8 Mbps.

In FIG. 5, a data field 301 includes an event URL (eventing URL). This URL (Uniform Resource Locators) indicates the location of event information set in association with content. The client specifies a URL, thus acquiring even information associated with content.

As mentioned above, the server holds event information location identification data corresponding to each piece of content, i.e., an event URL as property information constituting metadata concerning content. On the basis of the content information request from the client, the server extracts property information including the event URLs, generates XML data, and the generated data to the client.

Property information shown in FIG. 5 is a part of information stored as attribute information corresponding to content in the server. FIG. 5 shows some pieces of information which can be provided to the client. In addition to the above information in FIG. 5, the server provides various pieces of content information to the client in accordance with the property information acquisition request from the client.

When the property information is transmitted from the server to the client, the client generates a display screen (UI: user interface), in which content to be played back and event notification regarding the content can be requested, and displays the screen in the display.

Again referring to FIG. 4, the sequence of the process between the server and the client will now be further described. In step S22, the server transmits the above-mentioned generated XML data to the client, the XML data being generated based on property information including the event URLs indicating the locations of pieces of event information set in association with content. When receiving the data, the client displays a content information list based on the XML data in the display.

In displaying the content information list, the display shows a list of content URLs (Uniform Resource Locators), serving as location information regarding content possessed by the server, and event URLs indicating the locations of pieces of event information for event notification, the pieces of event information being set in association with pieces of content, respectively. Alternatively, the display shows data, such as pieces of text data linked with the respective corresponding URLs.

On condition that the user of the client specifies (clicks on) a certain content URL or link data shown in the client display, the client generates a request, serving as a content acquisition request, according to the GET method of HTTP (Hyper Text Transfer Protocol) and transmits the request to the server.

Figure 6:
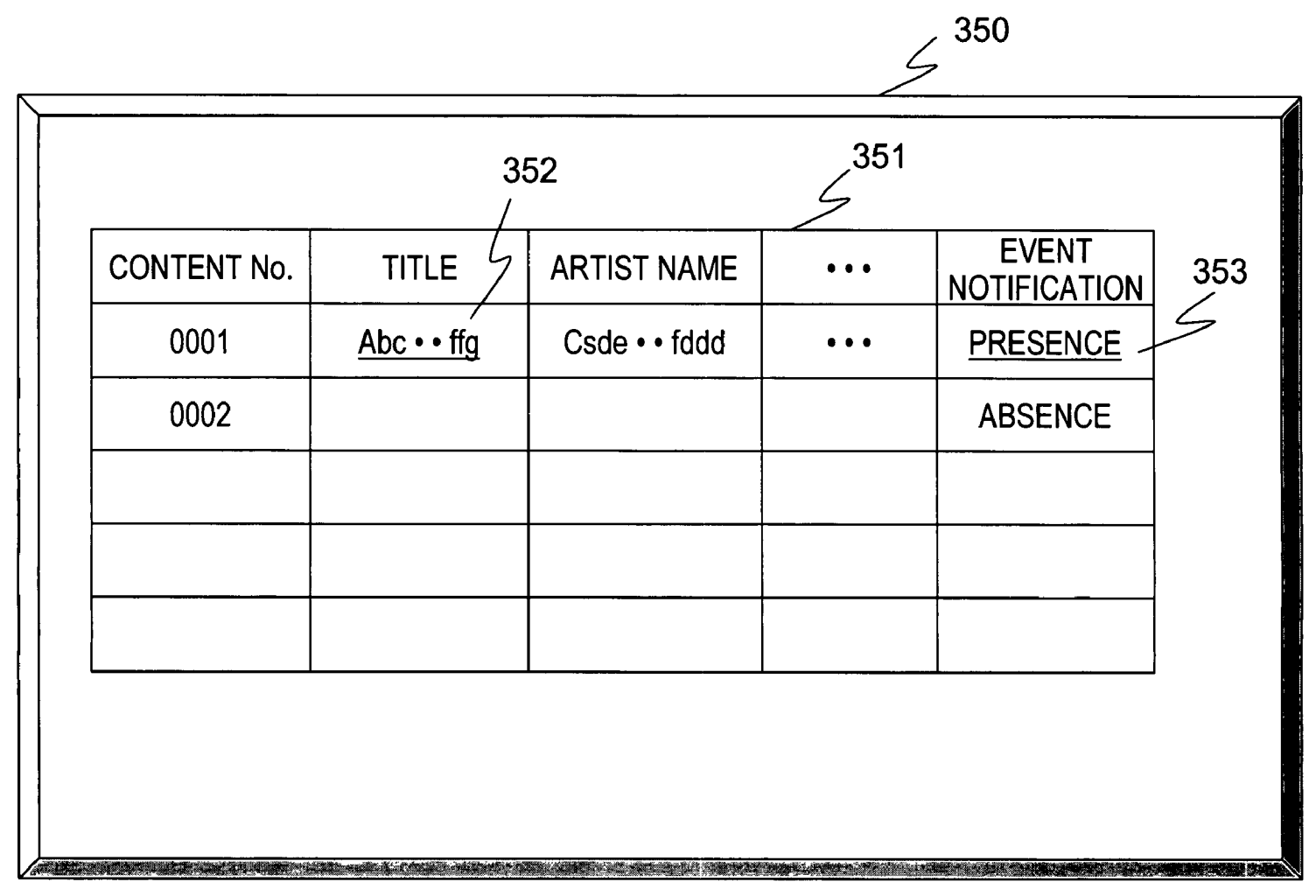

FIG. 6 shows a display example of the content information list shown in the display of the client. Referring to FIG. 6, a content list 351 is shown in a display 350. The list includes content Nos., titles as pieces of content fundamental information, and artist names. In the example shown in FIG. 6, the presence or absence of an event notification is further shown.

Display information as shown in FIG. 6 is generated according to a display processing program, which the client device previously stores, on the basis of the XML data based on the property information received from the server. Therefore, a display form varies depending on the setting of the display processing program.

In the example shown in FIG. 6, in the content list 351, display data 352 indicating a title is set as link information relating to a content URL. When the user specifies (clicks on) the display data 352 indicating the title, the client generates a content acquisition request and transmits the request to the server. The content acquisition request generated by the client is, e.g., an HTTP GET-method request. The HTTP GET-method request specifying the content URL is transmitted from the client to the server.

In the content list 351 shown in FIG. 6, display data 353 indicating the presence or absence of an event notification in an event notification field is set as link information relating to an event URL. When the user specifies (clicks on) the display data 353 in the event notification field, the client generates an event issuing request and transmits the generated request to the server. The event issuing request is, e.g., an HTTP POST-method request. The HTTP POST-method request which specifies the event URL is transmitted from the client to the server.

Again referring to FIG. 4, the sequence of the process between the server and the client will be further described. In step S23, on the basis of the XML data including the property information received from the server, the client shows display information as shown in FIG. 6 in the display of the client. As mentioned above, the display information includes content URLs and event URLs, or link data regarding those URLs.

In step S24, the client generates an event issuing request on the basis of the display information and transmits the request to the server. In other words, on the basis of the click on an event URL or link data by the user, an HTTP POST-method request specifying the event URL is transmitted from the client to the server.

When receiving the HTTP POST-method request specifying the event URL from the client, in step S25, the server generates a response to the event issuing request to the client, the response containing a session ID.

In step S26, the client generates a content transmission request based on the display information and transmits the request to the server. In other words, on the basis of the click on a content URL or link data by the user, an HTTP GET-method request specifying the content URL is transmitted from the client to the server.

When receiving the HTTP GET-method request specifying the content URL from the client, in step S27, the server starts to transmit the content. In step S28, the client starts to play back the content received from the server. The content transmission is executed until the requested content is finished. All the while, a content transmission connection is maintained between the server and the client.

In addition, simultaneously with the content transmission connection, an event notification connection is established between the server and the client. Each time an event occurs, the corresponding event information is transmitted from the server to the client through the event notification connection. Regarding event information, a communication packet is generated according to HTTP (Hyper Text Transfer Protocol) on the basis of event information specified by an event URL and is then transmitted to the client.

Figure 7:
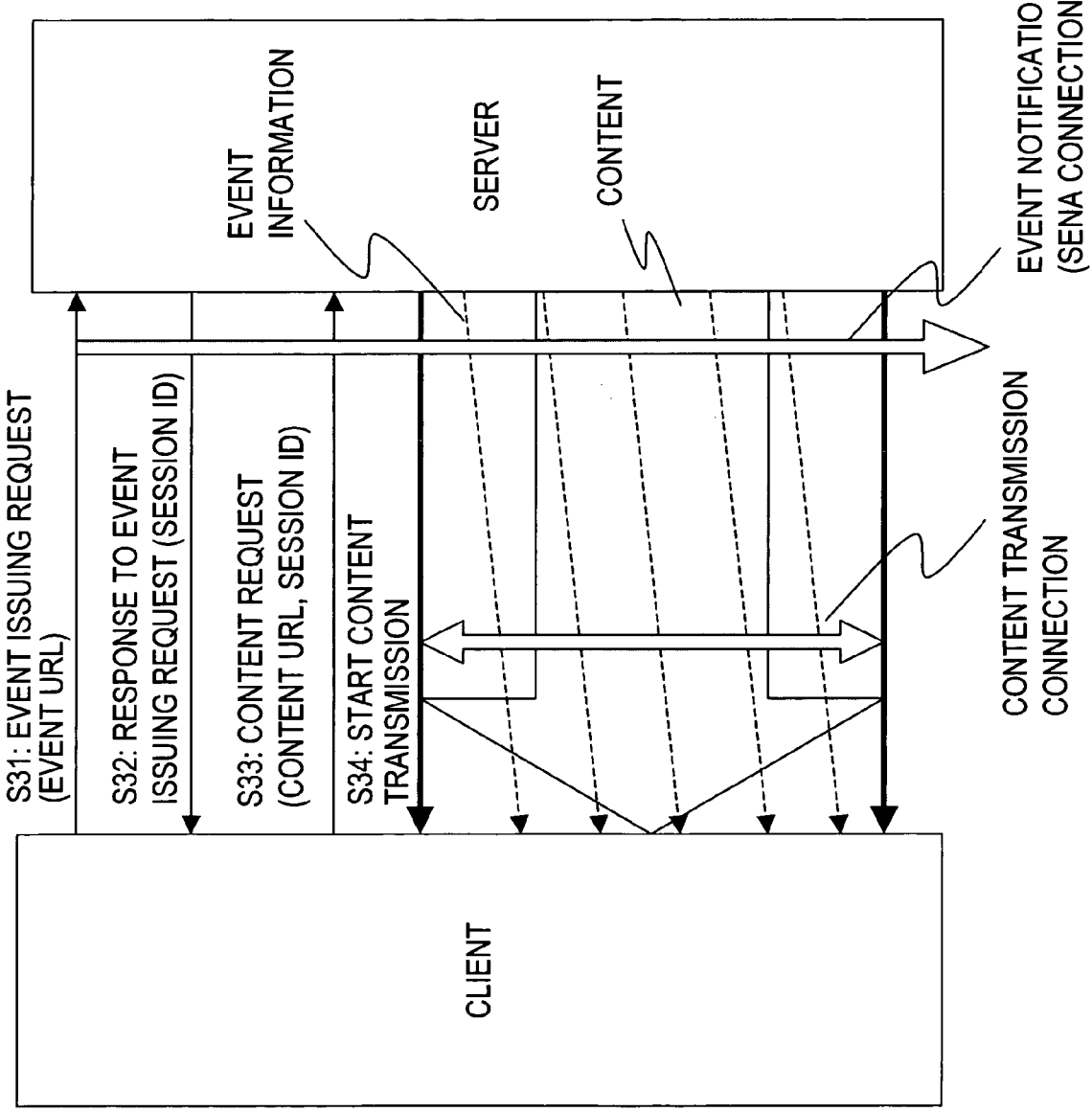
FIG. 7 is a diagram showing a detailed sequence of transmitting content and event information.

A process subsequent to transmission (S24) of the event issuing request in FIG. 4 will now be described in detail with reference to FIG. 7. FIG. 7 shows a processing sequence after the client acquires content information and also acquires content URLs and event URLs.

In step S31, the client transmits an event issuing request, which specifies any one of event URLs obtained from the server, to the server. In this step, the user specifies an event URL or link data on the basis of display information (e.g., FIG. 6) based on the content information received from the server, thus transmitting an HTTP POST-method request which contains the event URL.

When receiving the HTTP POST-method request containing the event URL from the client, the server generates a session ID corresponding to the client and stores the ID in the storage unit in the server. For example, FIG. 8 shows a session ID table in which client identification information is associated with the corresponding session ID.

After generating a session ID and storing the session ID, in step S32, the server transmits a packet, which contains the generated session ID, serving as a response to the event issuing request, to the client. HTTP packets are not finished up to the response. The event notification connection between the server and the client is continued and event notifications are continuously or intermittently performed.

When the event notification connection with the session ID is established between the server and the client, the server notifies the client of an event at regular time intervals to confirm the existence of the client. If there is no response (Ack) from the client, the connection is disconnected and the session ID stored in the ID table is deleted. In other words, simultaneously with the content transmission to the client, the server transmits data to confirm the existence of the client at regular time intervals through the event information notification connection and then determines whether the client is existing on the basis of the presence or absence of a client's response to the data transmission.

In step S33, the client specifies the URL of content corresponding to data which the event notification request has been transmitted with respect to, thus transmitting a content request. The content request contains the session ID which has been received from the server in step S32. In other words, the client generates an HTTP GET-method request containing the session ID and the content URL on the basis of the click on the content URL or link data by the user and then transmits the generated request as a content request to the server. The session ID is stored in an extension header.

The server acquires the content on the basis of the content URL contained in the content request received from the client and then starts the transmission of the acquired content to the client in step S34. Further, the server acquires event information in accordance with the event URL simultaneously with the content transmission and transmits the acquired event information to the client. The client receives the content from the server and further receives the event information corresponding to the content through the connection identified based on the session ID simultaneously with the content reception.

Examples of event information transmitted from the server to the client will now be described with reference to FIG. 9.

FIG. 9 shows four kinds of event information, i.e., information regarding the start of content (START), information regarding the end of content (LAST), buffer information (BufferInfo), and audio mode (AudioMode) information.

Information regarding [the start of content (START)] provides a notification about that an event synchronized with content starts, i.e., a content start event notification about that content playback starts.

Information regarding [the end of content (LAST)] provides a notification about that the transmission of event information synchronized with content is completed, i.e., a content end event notification.

While the event notification connection is existing, the server always transmits [buffer information (BufferInfo)] at regular time intervals, e.g., once per 30 seconds. The server determines that as long as a client does not receive the event, the client does not exist.

According to the notification process, information regarding the status of a content buffer included in the server is transmitted. For example, if the server has a tuner, stores live content according to satellite broadcasting in a ring buffer, and transmits data stored in the ring buffer to a client, a content data area in the ring buffer is provided in, e.g., time information.

Specific notification information includes data regarding [maximum buffer capacity (duration)], [capacity (duration) in which seeking is possible currently], [time in current streaming time base], and [Now (seek default) time]. A format example is as follows.

Format:

BufferInfo=[maxBufferDuration] [currentBufferDuration] [currentPlayingTime] [NowTime].

When content is a video capsule serving as data stored in a hard disk of the server, an example of buffer information in this case is as follows.

Event:BufferInfo=[00:10:00.000] [00:10:00.000] [00:04:30. 000] [00:00:00] CRLF

When content is live data, an example of data is as follows.

Event:BufferInfo=[00:30:00.000] [00:16:32.500] [132:42:30 .000] [132:42:30.000] CRLF Information regarding [audio mode (AudioMode)] indicates an audio mode. Specifically, the audio mode information indicates a monaural mode, a stereo mode, or a bilingual mode. When the content transmission starts or mode switching occurs, event information is transmitted.

Regarding an event information notification process which is not shown in FIG. 9, a heart beat event notification to confirm the existence of a client is transmitted from the server to the client at regular time intervals, thus confirming the existence of the client on the basis of the presence or absence of a response from the client.

The server manages event information corresponding to content to be transmitted to a client on the basis of the corresponding session ID. In other words, binding event information corresponding to transmission content is performed based on session IDs assigned to the respective clients.

Binding transmission content to event information will now be described with reference to FIGS. 10 and 11. As mentioned above, when receiving an event issuing request from a client, a server generates a session ID and notifies the client of the generated session ID and stores the session ID in a session ID table such that the session ID is associated with the client as described with reference to FIG. 8.

Figure 10:
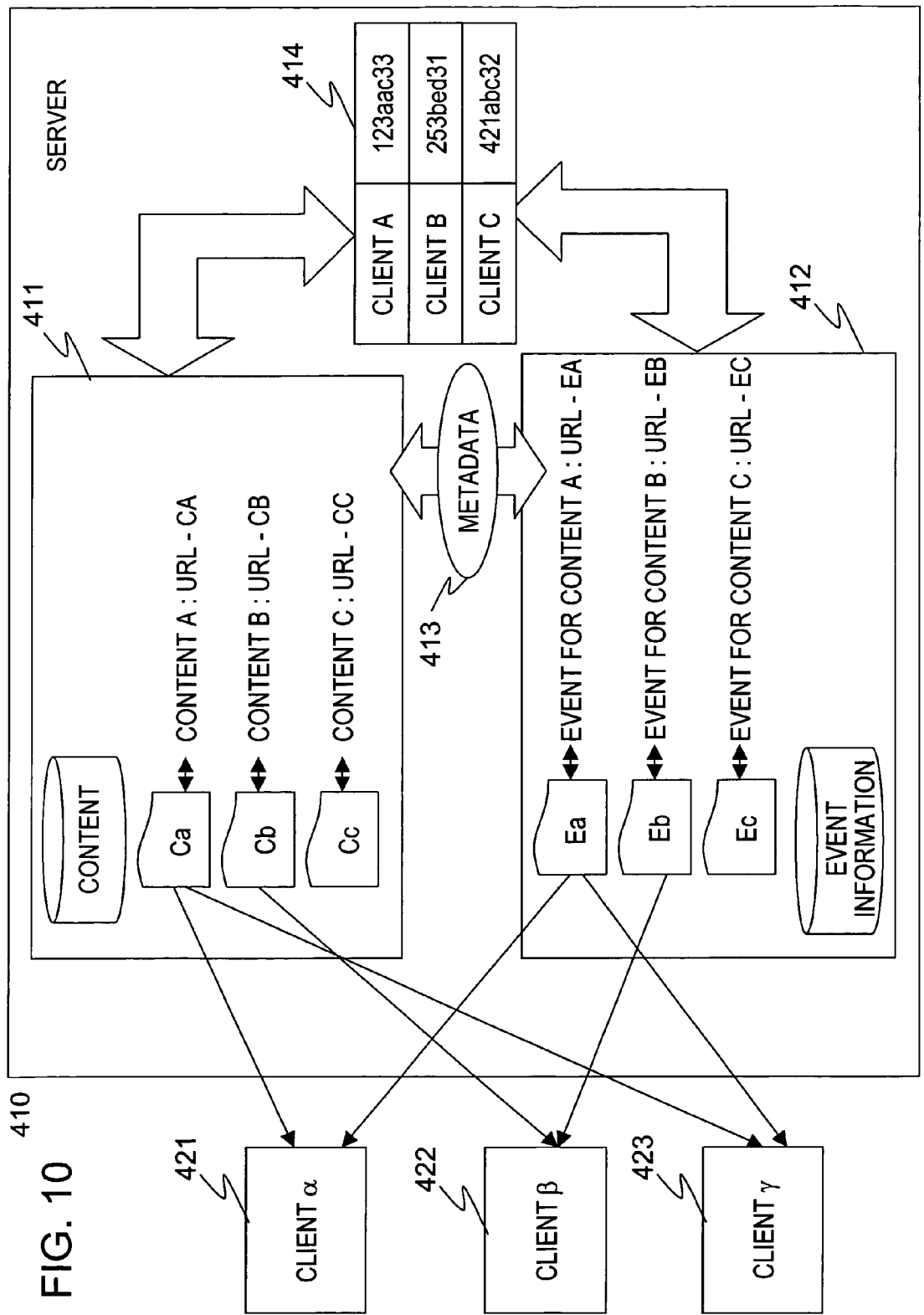
FIG. 10 is a diagram explaining management of event information transmitted from a server to clients.
Figure 11:
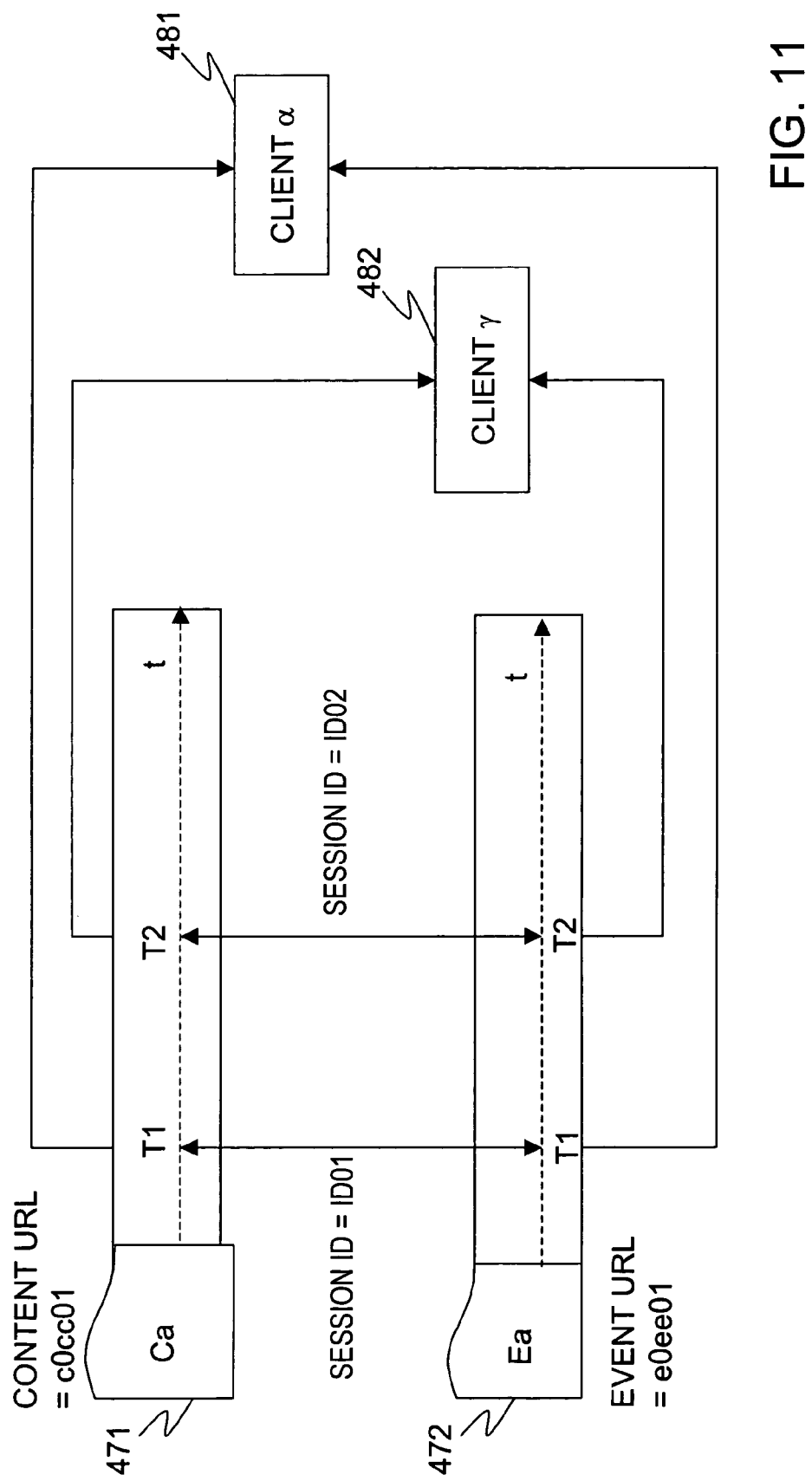
FIG. 11 is a diagram explaining synchronous transmission of event information from a server to clients.

As shown in FIG. 10, a server 410 has content data 411, in which the location of each piece of content is shown by the corresponding content URL, and event data 412, in which the location of each piece of event information is shown by the corresponding event URL. The URLs of pieces of event information are written in metadata 413 regarding content. The URL of event information can be acquired on the basis of the metadata 413 regarding content. In addition, the server 410 has a session ID table 414 in which clients are associated with session IDs, respectively. The server 410 can determine event notification timing for each client on the basis of the session ID.

While transmitting content Ca to each of a client α 421 and a client γ 423 and transmitting content Cb to a client β 422, the server 410 simultaneously notifies the respective clients of events.

Each of the client α 421 and the client γ 423 is notified of an event based on event information Ea corresponding to the content Ca. The client β 422 is notified of an event based on event information Eb corresponding to the content Cb. The location of event information is clarified by the corresponding event URL set in association with the event information.

The server assigns a session ID to each client, serving as a content transmission destination, and stores the relationship between each session ID and the corresponding client. Therefore, the server acquires a session ID related to each client, discriminates between event notification sessions (connections) of the respective clients on the basis of the session IDs, acquires event information synchronized with each piece of content from pieces of event information identified based on the connection URLs of the discriminated sessions, i.e., event URLs, and notifies each client of the corresponding event.

A process of notifying of an event synchronized with transmission content will now be described with reference to FIG. 11. FIG. 11 shows a case where content 471 identified by a content URL: c0cc01 and event information (event URL: e0ee01) 472 corresponding thereto are transmitted to two clients, i.e., a client α 481 and a client γ 482. The content is data stored in a ring buffer of a server. Time positions of the content transmitted to the two clients are different from each other.

In other words, the content is transmitted to the client α 481 at time T1 in time base (t) as shown in the diagram and the content is transmitted to the client γ 482 at time T2. In this case, the event information to be transmitted to each client is specified by the same event URL (event URL: e0ee01). It is necessary to transmit the event information corresponding to each content transmission position.

The server acquires a session ID set in association with each client from the session ID table (refer to FIG. 8) and transmits the acquired session ID to each client synchronously with event information in the corresponding content transmission position. In other words, as shown in the diagram, the event information in a position corresponding to time T1 in time base (t) is transmitted to the client α 481 and the event information in a position corresponding to time T2 is transmitted to the client γ 482. Each client can be notified of an event synchronized with transmitted content.

As mentioned above, the server determines a data transmission position of content to be transmitted to each client on the basis of the session ID table in which each client is associated with the corresponding session ID and then notifies each client of event information synchronized with transmitted content on the basis of information regarding the determination.

In the configuration according to the present invention, a server stores event URL information in metadata corresponding to content stored in a storage unit of the server, acquires content URLs from the metadata on the basis of the reception of a content information request from a client, generates content information as, e.g., XML data, and transmits the generated information to the client. Further, on condition that the server receives an event notification request specifying an event URL from the client, the server assigns a session ID to the client.

Therefore, the server can manage an event notification process based on an event URL and a session ID. For example, when the same content is transmitted to a plurality of clients, transmission event information can be determined by one event URL. In addition, timing of notifying each client of an event can be controlled based on the corresponding session ID. Therefore, the load of managing data in the event notification process on the server can be lightened. When content is transmitted to a plurality of clients at different timings, each client can be notified of a correct event synchronized with the transmitted content according to control based on the corresponding session ID set in association with the client.

Figure 12:
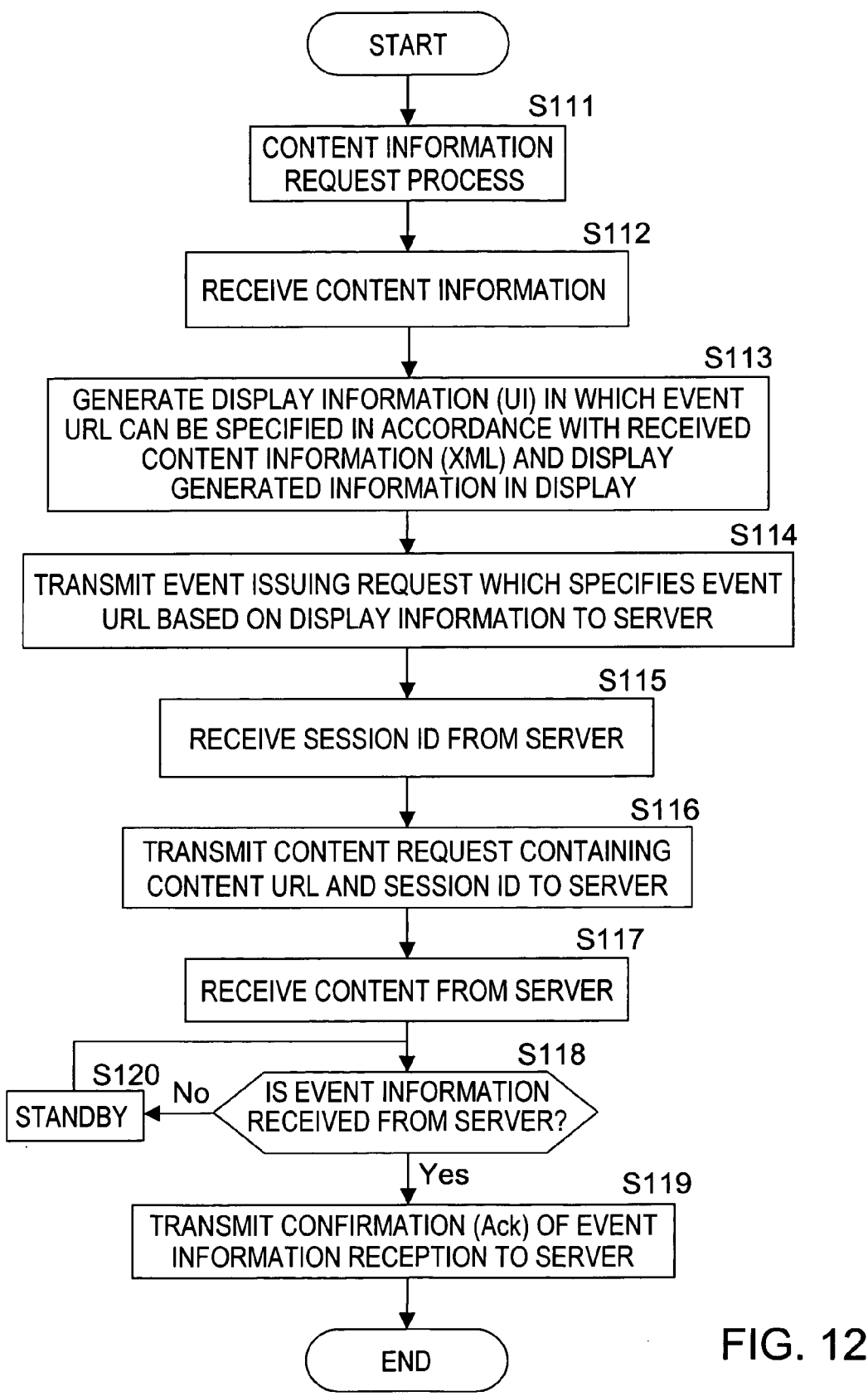
FIG. 12 is a flowchart explaining a process by a client in content transmission and reception involving event notification.

A process of acquiring event URLs in a client device, acquiring event information based on an event URL, and receiving content will now be described with reference to a flowchart of FIG. 12.

In step S111, a client device transmits a content information acquisition request to a server. In step S112, the client device receives content information. The content information received by the client is XML (extended Markup Language) data containing content information, such as content titles and artist names, content URLs (Uniform Resource Locators), serving as address information, indicating the locations of pieces of content, and event URLs (Uniform Resource Locators), serving as address information, indicating the locations of pieces of event information associated with pieces of content.

In step S113, the client generates display information (UI) based on the received information and displays the information in a display. As described with reference to FIG. 6, an event issuing request which specifies an event URL can be generated in the display information. In addition, the display information includes URL information or link information whereby a content URL is specified to generate a content request.

In step S114, a user transmits an event issuing request which specifies an event URL to the server on the basis of the content information displayed in the display of the client device. Specifically, the user specifies an event URL or link data based on the display information (e.g., FIG. 6), thus transmitting an HTTP POST-method request containing the event URL.

In step S115, the client receives a session ID issued by the server. In step S116, the client transmits a content request containing a content URL and the session ID to the server. Specifically, the client generates an HTTP GET-method request containing the session ID and the content URL and transmits the generated request as a content request to the server.

In step S117, the client starts to receive content from the server. When the client receives event information in step S118, the client transmits a response (Ack) to the event notification to the server in step S119. If the client does not receive event information, in step S120, the client is in standby mode until the client receives event information. Steps S118 to S120 are repeated until content transmission is finished.

Figure 13:
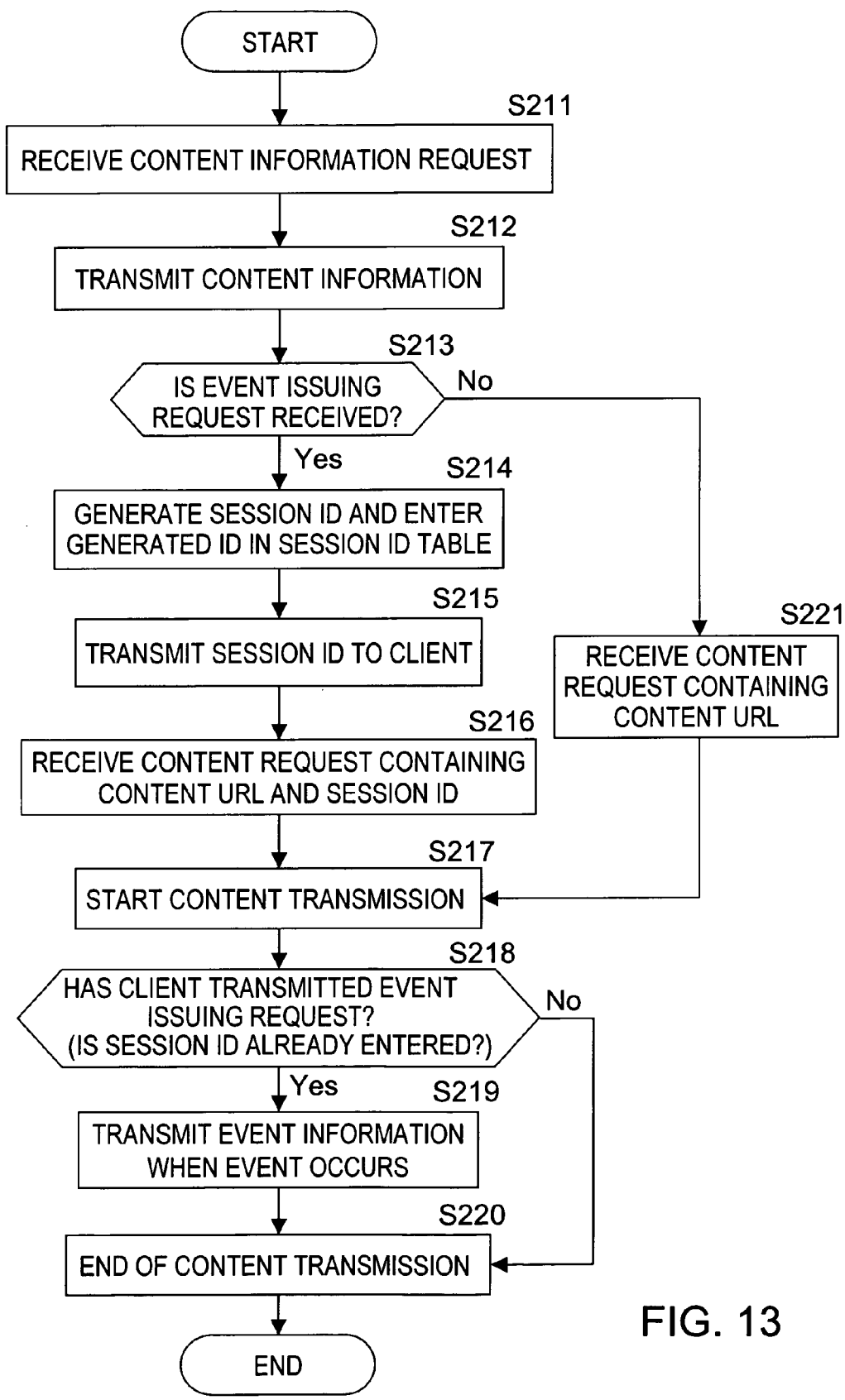
FIG. 13 is a flowchart explaining a process by a server in content transmission and reception involving event notification.

A process by a server will now be described with reference to FIG. 13. In step S211, the server receives a content information acquisition request from a client. In step S212, the server transmits content information. The transmitted information contains content URLs (Uniform Resource Locators) and event notification URLs set in association with respective pieces of content.

In step S213, the server determines the reception of an event issuing request which specifies an event URL. If the server receives no event issuing request (NO in step S213) and receives a content request containing a content URL in step S221, in step S217, the server executes a content transmission process including no event notification process.

If the server receives an event issuing request which specifies an event URL (YES in step S213), the server generates a session ID and enters the generated session ID in a session ID table (refer to FIG. 8) in which each session ID is associated with the corresponding client in step S214.

In step S215, the server transmits the session ID to the client. When receiving a content request containing a content ID and the session ID in step S216, the server starts to transmit content corresponding to the specified URL to the client in step S217.

In step S218, the server determines whether the client has transmitted the event issuing request, i.e., whether the client is already entered in the session ID table. If YES, in step S219, the server transmits event information identified by the event URL to the client when an event occurs. Regarding event information transmission, as described with reference to FIGS. 10 and 11, event information is transmitted as information synchronized with content to the client on the basis of the session ID. The event information transmission in step S219 is executed simultaneously with content transmission at any time and is successively performed until the content transmission is finished (S220).

When the client has not transmitted an event issuing request, i.e., the client is not entered in the session ID table, the event notification process is not executed. The process by the server is finished at the end of the content transmission. If the client has transmitted the event issuing request, the session is terminated as long as the content transmission is completed and a response to an event notification is not received.

[Functional Structures of Server and Client]

The hardware configuration of each of a server and a client device has already been described with reference to FIG. 2. The above-mentioned various processes are executed by CPUs, serving as control units of the server and the clients, according to programs stored in respective storage units.

The processes executed by the CPU on the server side include the process of acquiring metadata corresponding to content in accordance with a request from a client and generating XML data, serving as content information to be transmitted to the client, the process of generating a session ID based on an event issuing request from a client and entering the session ID in a session ID table, content transmission control, and event information transmission control.

The processes on the client side include the process of displaying the content information, whereby a content URL and an event URL can be specified, in a display on the basis of the XML data received from the server, the process of generating HTTP POST-method data containing the event URL and transmitting the data, the process of generating HTTP POST-method data containing the content URL and the session ID and transmitting the data, content reception, content playback, event information reception, and content playback control based on the received event information.

Those processes are fundamentally executed under the control of the CPUs, serving as the control units of the server and the client device. The functional structure of the server and that of each client will now be described with reference to FIGS. 14 and 15, the structures being needed to execute the above-mentioned processes.

Figure 14:
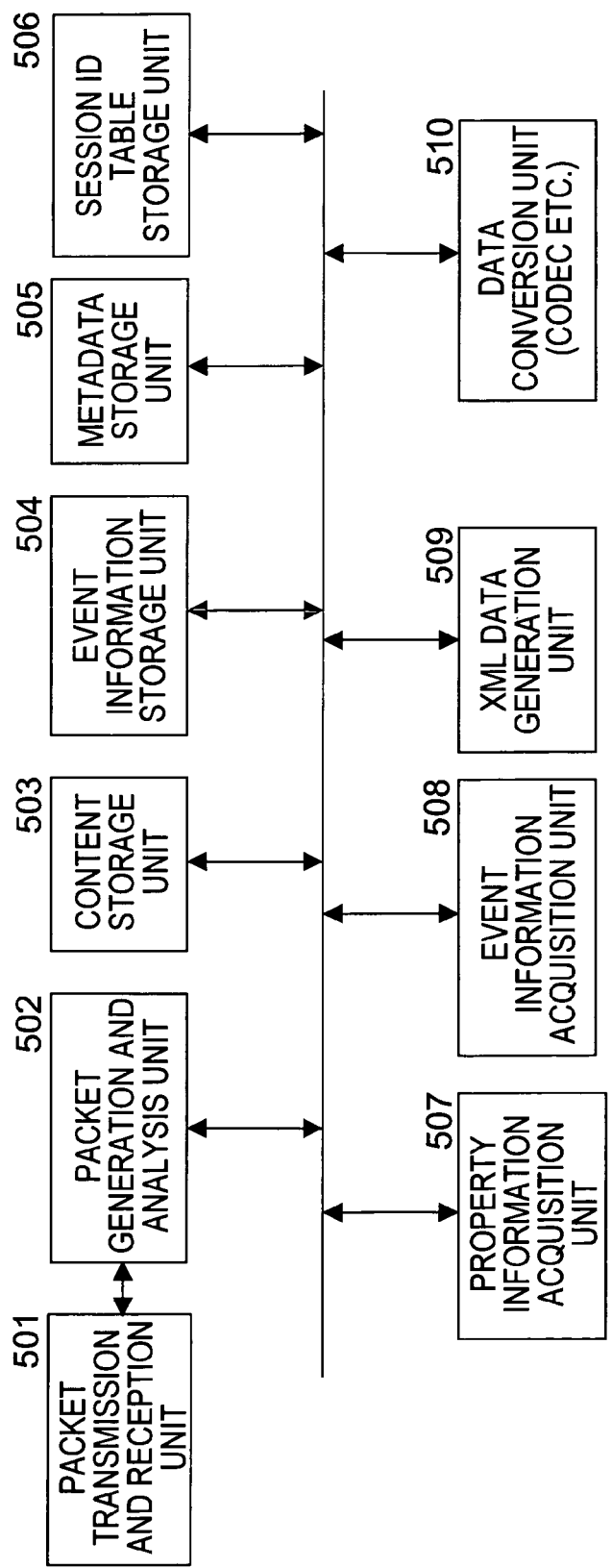
FIG. 14 is a block diagram of functions of a server.

FIG. 14 is a block diagram of the essential functional structure of a server. A packet transmission and reception unit 501 transmits/receives packets to/from a client. A packet generation and analysis unit 502 generates a transmission packet and analyses a received packet, i.e., sets an address of a packet, recognizes an address, stores data in a data field, and acquires data from a data field.

A content storage unit 503 stores content possessed by the server. Each piece of content can be specified by the corresponding content URL. An event information storage unit 504 stores event information corresponding to content. Each piece of event information can be specified by the corresponding event URL. A metadata storage unit 505 stores metadata, serving as attribute information corresponding to content. As mentioned above, the metadata storage unit 505 stores property information constituting metadata and holds event URLs, serving as property information. A session ID table storage unit 506 stores session IDs and client identifiers of clients, each of which has send an event issuing request, such that each session ID is associated with the corresponding client identifier.

A property information acquisition unit 507 acquires metadata corresponding to content from the metadata storage unit 505 on the basis of a content information acquisition request received from a client. An event information acquisition unit 508 acquires event information for a client, which has sent en event issuing request, from the event information storage unit 504. An XML data generation unit 509 generates XML data to be transmitted to a client on the basis of metadata obtained by the property information acquisition unit 507.

A data conversion unit 510 converts content possessed by the server into data in a form corresponding to a request from a client, i.e., executes file formatting, coding/decoding, and resolution conversion. For example, the data conversion unit 510 converts data according to ATRAC3 or MPEG4.

Subsequently, the functional structure of each client will now be described with reference to FIG. 15. A packet transmission and reception unit 601 transmits/receives packets to/from a server. A packet generation and analysis unit 602 generates a transmission packet and analyses a received packet. In addition to the analysis of data stored in a packet, the packet generation and analysis unit 602 sets an address of a packet, recognizes an address, stores data in a data field, and extracts data from a data field.

A storage unit 603 stores content information, content, event information, and a session ID included in each packet received from the server.

An output unit 604 includes a speaker and a display which are used to play back content. The display is also used to output display information as already described with reference to FIG. 6. An input unit 605 includes a keyboard and other data input means for inputting, e.g., information regarding selection of the data form of content, the information being displayed as display information.

An XML data analysis unit 606 analyses XML data, serving as content information, received from the server, generates display information including content URLs and event URLs, or link data thereof, which have already been described with reference to FIG. 6, and outputs the display information to the display constituting the output unit.

A content playback control unit 607 controls playback of content received from the server. As necessary, a data conversion unit 609 converts content received from the server before content playback. The content playback control unit 607 decodes data according to ATRAC3 or MPEG4.

An event information analysis unit 608 analyses event information received from the server. As mentioned above, event information includes, e.g., information regarding the status of a buffer of the server and audio mode information. The event information analysis unit 608 sends necessary information to the content playback control unit 607 on the basis of event information. The content playback control unit 607 controls the playback based on an event occurred. Information regarding the buffer status in the server and audio mode information are output to the output unit 604 and are then displayed in the display, thus notifying the user of event information regarding the playback content.

Figure 15:
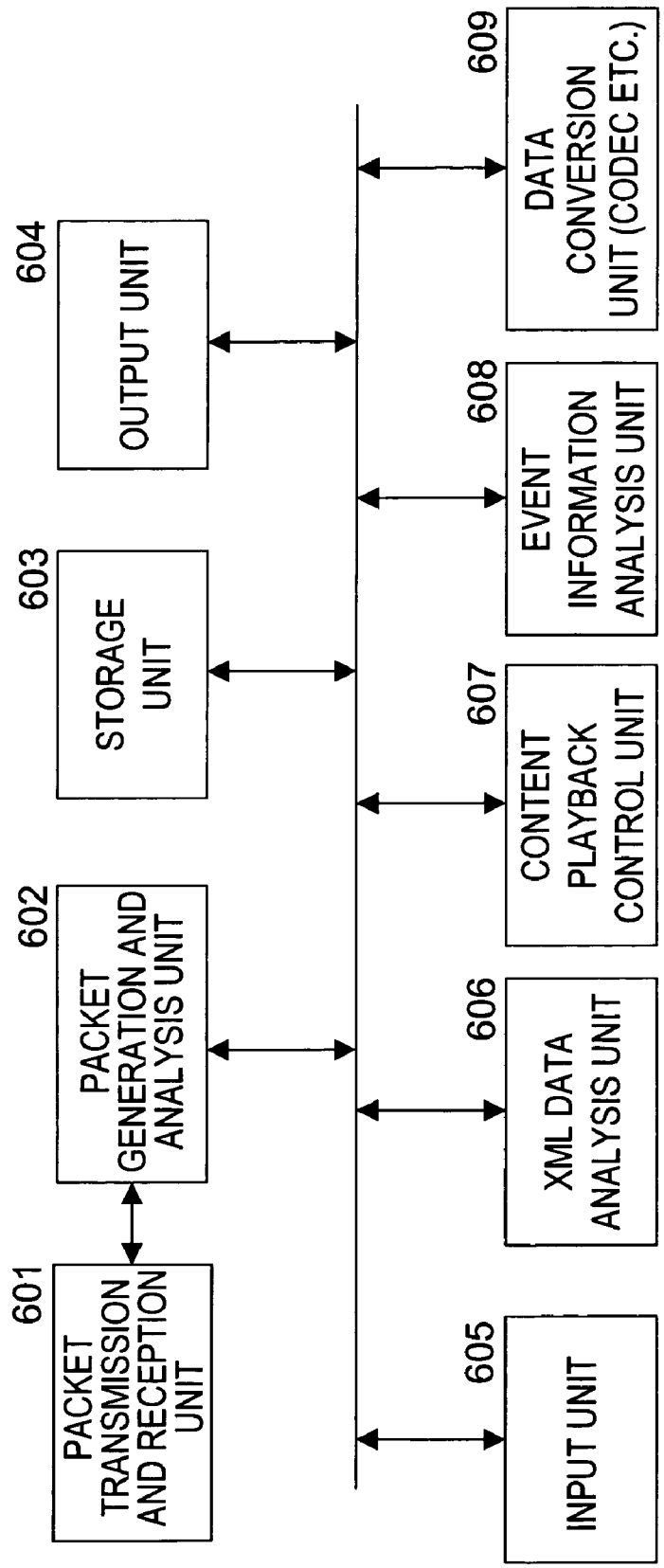
FIG. 15 is a block diagram of functions of each client.

The server and each client have the functions shown in FIGS. 14 and 15 and execute the above-mentioned processes. FIGS. 14 and 15 show the block diagrams explaining the functions. Actually, various processing programs are executed under the control of the CPU in the hardware configuration in FIG. 2 of each of a PC.

The present invention has been described in detail with respect to the specific embodiments. It will be obvious to those skilled in the art that various modifications and alternations may be made without departing from the spirit of the invention. In other words, the embodiments are illustrative for the purposes of the disclosure of the present invention. It is therefore to be understood that the present invention is not limited to the specific embodiments thereof. The scope of the present invention is to be determined by the following claims.

The processes described in the specification can be executed by hardware, software, or the composition of them. When the processes are executed by software, a program storing a processing sequence can be installed in a memory of a computer built in dedicated hardware and be then executed. Alternatively, the program can be installed in a general-purpose computer capable of implementing various processes and be executed.

The various processes described in the specification are executed on a time series basis as described therein. The processes can also be executed concurrently or individually as necessary or according to the throughput of a device which executes the processes. In the specification, a system is a logical set of units. It is not necessarily that the units are included in the same casing.

INDUSTRIAL APPLICABILITY

As mentioned above, according to the present invention, a content providing server assigns a session ID to a client on condition that the server receives an event notification request which specifies an event URL from the client, and manages an event notification process on the basis of the event URL and the session ID. Therefore, when transmitting content to a plurality of clients, event information to be transmitted can be determined based on an event URL associated with the corresponding piece of content. Timing when event information is sent to each client can be controlled on the basis of the corresponding session ID. Consequently, the load of managing data in the event notification process on the server can be reduced. Even when content is transmitted to a plurality of clients at different timings, correct event information synchronized with transmission content can be sent to each client by control based on the corresponding session ID.

In the configuration according to the present invention, the server which provides content stores event URL information in metadata corresponding to content. In response to a content information request from a client, the server extracts content URLs from the metadata, generates content information, and sends the generated content information to the client. Advantageously, an event URL can be efficiently acquired and event data can be transmitted to the client on the basis of a specification about content.

In the configuration according to the present invention, further, the server determines a data transmission position of content to be transmitted to each client on the basis of a session ID table in which each client is associated with the corresponding session ID and then sends event information to the client synchronously with the transmission content. Advantageously, an event notification process synchronized with content transmission for each client can be correctly executed.

Further, in the configuration of the present invention, each client receives event URLs from the server, generates a content list in which any event URL can be specified, and displays the list. In addition, when a user clicks on an event URL or link data, the client transmits the specified event URL to the server. Thus, event notification corresponding to content to be transmitted can be set without increasing burdens on the user.

The invention claimed is:

1. An information processing apparatus, serving as a content providing server, for transmitting content, the apparatus comprising:
 a data transmission and reception unit configured to transmit and receive data;
 a storage unit configured to store location information of event information corresponding to the content as metadata; and
 a control unit configured to control transmission of the content and the event information to each client, the control unit including
 a generation unit configured to generate a session ID corresponding to each client in response to an event issuing request, which specifies location information of the event information, from the client,
 a sending unit configured to send the generated session ID to the client,
 an entering unit configured to enter the session ID in a session ID table such that the session ID is associated with the corresponding client,
 a transmitting unit configured to transmit the content in response to a content request from the client which includes the session ID, and to transmit, simultaneously with the content transmission, the event information identifying specifications of the content and determined based on the location information received from the client in the event issuing request,
 wherein the control unit further includes a connection unit configured to establish an event issuing connection in response to the event issuing request and establish a content connection in response to the content request, the event issuing connection being established prior to the content connection, and
 wherein the connection unit continues to maintain the event issuing connection until it is determined that the client is non-responsive.

2. The information processing apparatus according to claim 1, wherein the control unit determines a data transmission position of transmission content to each client on the basis of the session ID table in which each client is associated with the corresponding session ID and sends event information synchronized with the transmission content to each client on the basis of information regarding the determination.

3. The information processing apparatus according to claim 1, wherein in response to a content information acquisition request from each client, the control unit generates content information including content URLs and the location information of event information, the content URLs indicating location information of content.

4. The information processing apparatus according to claim 1, wherein event information corresponding to content includes at least one of start information regarding content to be transmitted to a client, end information regarding thereto, buffer status information, and audio mode information, and the control unit sends the event information to the client simultaneously with the content transmission to the client.

5. The information processing apparatus according to claim 1, wherein the control unit generates and transmits the event information as a communication packet according to HTTP (Hyper Text Transfer Protocol).

6. The information processing apparatus according to claim 1, wherein the control unit determines that the client is non-responsive by transmitting data to confirm the existence of the client at regular time intervals through the event issuing connection simultaneously with the content transmission to the client and determining whether the client is existing on the basis of the presence or absence of a response from the client to the transmitted data.

7. An information processing apparatus, serving as a client, for playing back content, comprising:
a data transmission and reception unit configured to transmit and receive data to/from a server which provides content; and
a control unit configured to generate an event issuing request to be transmitted to the server such that the event issuing request contains location information of event information corresponding to the content, and configured to generate a content request to be transmitted to the server such that the content request contains a session ID included in data received from the server, the data serving as a response to the event issuing request,
wherein the data transmission unit is configured to receive the simultaneously transmitted content and the event information, in response to the content request and the event issuing request, respectively, the event information identifying specifications of the content and determined based on the location information included in the event issuing request and the content request including the session ID, and
wherein an event issuing connection is established in response to the event issuing request and a content connection is established in response to the content request, the event issuing connection being established prior to the content connection, the event issuing connection being maintained until the server determines that the information processing apparatus is non-responsive.

8. The information processing apparatus according to claim 7, wherein the control unit transmits an HTTP (Hyper Text Transfer Protocol) POST-method request, serving as the event issuing request, to the server.

9. The information processing apparatus according to claim 7, wherein the information processing apparatus receives content from the server and simultaneously receives event information corresponding to the content through a connection identified by the corresponding session ID.

10. The information processing apparatus according to claim 7, wherein the control unit generates display information in a form allowing to specify any of event URLs (Uniform Resource Locators), which are included in content information received from the server and indicate location information of event information corresponding to content.

11. A content distribution system comprising a server which transmits content and clients each of which transmits a content request to the server, wherein
the server includes:
a data transmission and reception unit configured to transmit and receive data;
a storage unit configured to store location information of event information corresponding to the content as metadata; and
a server control unit including
a generation unit configured to generate a session ID corresponding to each client in response to an event issuing request, which specifies location information of the event information, from the client,
a sending unit configured to send the generated session ID to the client,
an entering unit configured to enter the session ID in a session ID table such that the session ID is associated with the corresponding client,
a transmitting unit configured to transmit the content in response to a content request from the client which includes the session ID and to transmit, simultaneously with the content transmission, the event information identifying specifications of the content and specified based on the location information received from the client in the event issuing request,
a connection unit configured to establish an event issuing connection in response to the event issuing request and establish a content connection in response to the content request, the event issuing connection being established prior to the content connection, and configured to continue to maintain the event issuing connection until it is determined that the client is non-responsive, and
each client includes:
a data transmission and reception unit configured to transmit and receive data to/from the server; and
a client control unit configured to generate an event issuing request to be transmitted to the server such that the event issuing request contains location information of event information corresponding to the content, and configured to generate a content request to be transmitted to the server such that the content request contains a session ID included in data received from the server, the data serving as a response to the event issuing request.

12. The content distribution system according to claim 11, wherein the server control unit determines a data transmission position of transmission content to each client on the basis of the session ID table in which each client is associated with the corresponding session ID and sends event information synchronized with the transmission content to each client on the basis of information regarding the determination.

13. A content information processing method comprising:
receiving an event issuing request from a client, the request specifying location information of event information corresponding to content;
generating a session ID corresponding to the client in response to the event issuing request and sending the generated session ID to the client;
entering the session ID in a session ID table such that the session ID is associated with the corresponding client;
transmitting content in response to a content request from the client which includes the session ID;
establishing an event issuing connection in response to the event issuing request;
establishing a content connection in response to the content request, the event issuing connection being established prior to the content connection;
transmitting, simultaneously with the content transmission, the event information identifying specifications of the content and determined based on the location information received from the client in the event issuing request; and
maintaining the event issuing connection until it is determined that the client is non-responsive.

14. The content information processing method according to claim 13, wherein a data transmission position of content to be transmitted to each client is determined on the basis of the session ID table in which each client is associated with the corresponding session ID and event information synchronized with the transmission content is sent to the client on the basis of information regarding the determination.

15. The content information processing method according to claim 13, further including:
generating content information which contains content URLs and the location information of event information in response to a content information acquisition request from each client, the content URLs indicating location information of content.

16. The content information processing method according to claim 13, wherein
event information corresponding to content includes at least one of start information regarding content to be transmitted to a client, end information regarding thereto, buffer status information, and audio mode information.

17. The content information processing method according to claim 13, wherein a communication packet according to HTTP (Hyper Text Transfer Protocol) is generated and transmitted as the event information.

18. The content information processing method according to claim 13, further including:
transmitting data to confirm the existence of the client at regular time intervals through an event information notification connection simultaneously with the content transmission to the client and determining that the client is non-responsive based on whether the client is existing on the basis of the presence or absence of a response from the client to the transmitted data.

19. A content information processing method comprising:
generating an event issuing request to be transmitted to a server such that the event issuing request contains location information of event information corresponding to content;
transmitting the generated event issuing request to the server, an event issuing connection being established in response to the event issuing request;
generating a content request which contains a session ID received as a response to the event issuing request from the server;
transmitting the generated content request to the server, a content connection being established in response to the content request, the event issuing connection being established prior to the content connection and the event issuing connection being maintained until the server determines that the information processing apparatus is non-responsive; and
receiving the simultaneously transmitted content and the event information in response to the content request and the event issuing request, respectively, the event information identifying specifications of the content and determined based on the location information included in the event issuing request and the content request including the session ID.

20. The content information processing method according to claim 19, wherein, an HTTP (Hyper Text Transfer Protocol) POST-method request is transmitted as the event issuing request to the server.

21. The content information processing method according to claim 19, further including:
receiving content from the server and simultaneously receiving event information corresponding to the content through a connection identified by the session ID.

22. The content information processing method according to claim 19, further including:
generating display information in a form allowing to specify any of event URLs (Uniform Resource Locators), which are included in content information received from the server and indicate location information of event information corresponding to content.

* * * * *